July 23, 1957 H. J. CHADWICK 2,799,899
PANEL AND FASTENER THEREFOR
Filed Nov. 1, 1954
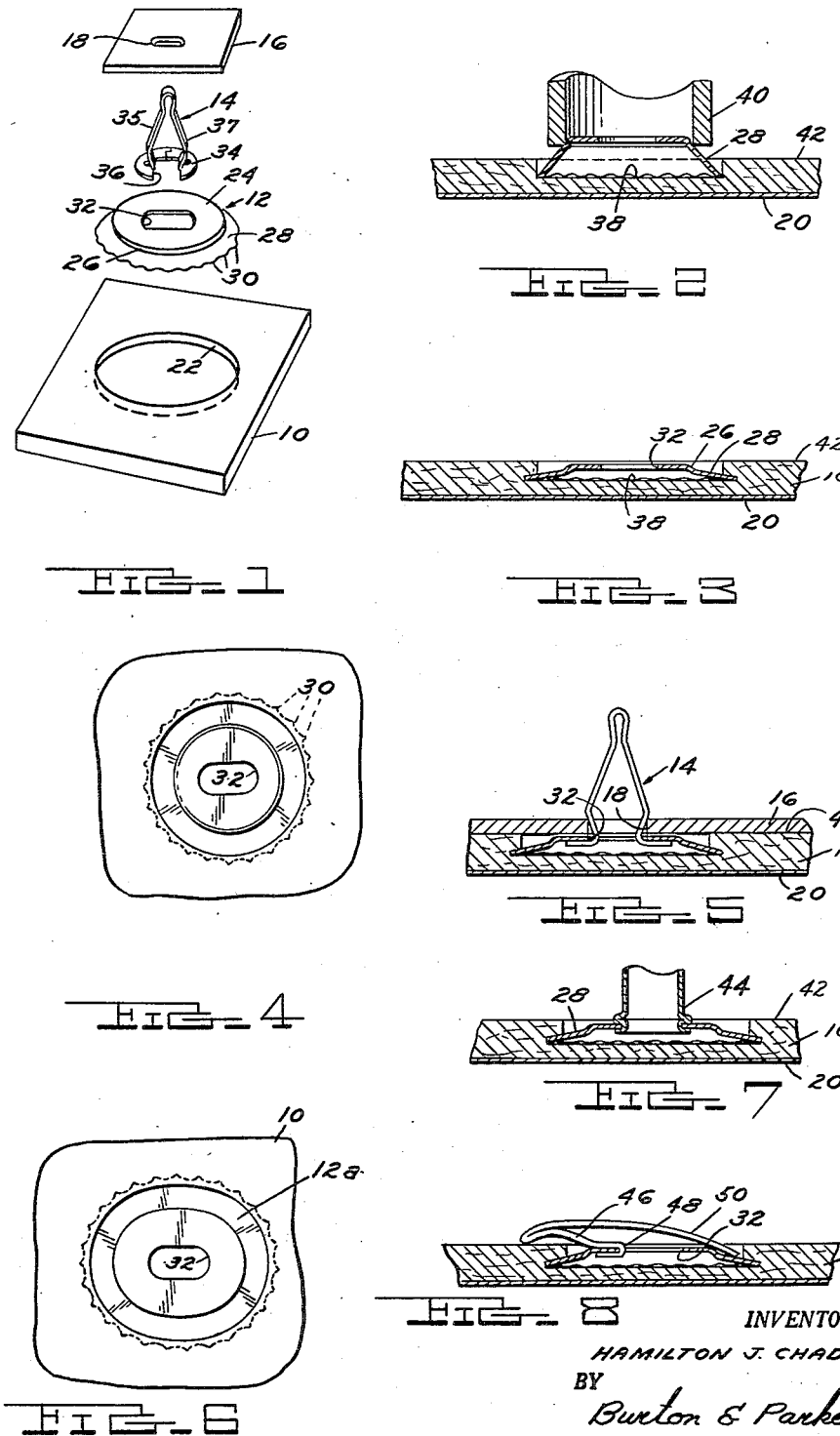
INVENTOR.
HAMILTON J. CHADWICK
BY
Burton & Parker
ATTORNEYS

United States Patent Office 2,799,899
Patented July 23, 1957

2,799,899
PANEL AND FASTENER THEREFOR

Hamilton J. Chadwick, St. Clair Shores, Mich., assignor to Woodall Industries, Incorporated, Detroit, Mich., a corporation of Michigan Application November 1, 1954, Serial No. 466,021

2 Claims. (Cl. 20—15)

This invention relates to a retainer plate which is capable of being readily and permanently secured to a panel or the like, and which plate is so constructed as to have a fastener or other connection secured thereto to be held thereby.

An object of the invention is the provision of a retainer plate which may be secured to a panel without the use of screws, glue, or the like.

An important feature is the provision of a retainer plate which has its periphery so formed that such periphery may be forced into the panel structure and distorted as it is inserted thereinto, whereby the plate is held securely to the panel. Another important feature is that the retainer plate is provided with a crown portion adapted to support a connection.

Another object of the invention is the provision of a generally circular resistingly deformable retainer plate somewhat arcuately shaped in cross section and provided at the periphery with prongs or serrations, and as the plate is flattened against a panel, its margin is forced into the panel and deformed as so forced whereby it holds the plate securely to the panel.

Another object of the invention is the provision of a retainer plate which is adapted to be received within a recess in the surface of a panel shaped to receive the plate and the periphery of which plate is provided with a plurality of outwardly extending prongs which, as the plate is flattened, are extended laterally into the sides of the recess to securely hold the plate in the recess.

More particularly the plate is generally arcuate in cross section and the crown of the plate is adapted to be fitted with a connection to support the connection. Such crown of the plate may be provided with a fastener receiving slot adapted to receive and hold a fastener. Such crown of the plate may be provided with a tubular connection or the like. When the margin of the plate is embedded in the side of a recess in the panel the crown of the plate is supported normally spaced above the bottom of the recess.

Another object is the provision of a panel with such a retainer plate, which plate has a marginal portion that is distorted and stretched as it is entered into the panel, and distorted in such a manner that withdrawal of the plate from the panel can be accomplished only with great difficulty and the plate cooperates with a suitable fastener to secure the panel upon a foundation.

Another object is an improved process for fabricating a combined panel and retainer plate to securely fasten the plate to the panel against separation therefrom.

Other objects, advantages, and meritorious features will more fully appear from the specification, claims, and accompanying drawing, wherein:

Fig. 1 is an exploded view of the panel, my improved retainer plate, a fastener adapted to be coupled with the plate, a portion of a panel recessed to receive the plate, and a portion of a frame apertured to receive the fastener;

Fig. 2 is a cross sectional view through a panel showing my improved retainer plate disposed in a recess therein and before the plate is secured to the panel;

Fig. 3 is a cross sectional view through a panel showing my improved retainer plate secured thereto;

Fig. 4 is a top view of my improved retainer plate secured to a panel;

Fig. 5 is a cross sectional view of a panel secured to a frame member by the provision of my improved retainer plate and a fastener element;

Fig. 6 is a top view of a retainer plate similar to that shown in Figs. 1–5, but of a slightly different shape;

Fig. 7 is a cross sectional view taken on the same line as Fig. 5 but showing the retainer plate supporting a tubular connection; and Fig. 8 is a cross sectional view taken on the same line as Figs. 5 and 7 but showing a different form of fastener connection secured to the plate.

In Fig. 1 I have shown a fragment of a panel 10 to which my improved retainer plate 12 is to be secured. A spring type fastener 14 is adapted to be received through a slot in the plate to be held coupled with the plate. A fragment of a frame member 16 upon which the panel is sought to be mounted, is provided with a slot 18 through which the arms of the fastener 16 are received to hold the fastener to the frame.

The panel 10 may be made of wood, pressed fiberboard, Masonite, or any other suitable material. The panel may be covered on one surface with a plastic coating 20 or covering material if such is desired. The character and finish of the panel forms no part of this invention. The opposite surface 42 of the panel is recessed as at 22 to receive my improved retainer plate 12. The recess conforms generally to the shape of the retainer plate. In Figs. 1 and 4 the retainer plate is shown as being circular in shape. In Fig. 6 a similar retainer plate 12–a is elongated slightly but it may be termed substantially circular.

The retainer plate is formed of resistingly deformable metal such as sheet steel. It is arcuately shaped or crowned in cross section. It might also be termed frustum-shaped, with the frustum being hollow and closed at the smaller end by a crown portion 24. The apex of the crown is substantially planar. Adjacent the periphery of the crown the plate is abruptly bent downwardly as at 26. From this bend or shoulder 26, the crown is provided with an outwardly, angularly depending skirt portion 28. At the periphery of the retainer plate, or, in other words, at the periphery of the skirt of the plate, the plate is shaped to exhibit a serrated edge formed of a plurality of prongs 30. The entire periphery is provided with these prongs. They serve the purpose hereinafter described.

If the retainer plate is to hold a fastener, the crown 24 of the retainer plate may be slotted as at 32. The slot may be elongated as shown and it is adapted to receive therethrough the head portion 34 of the spring fastener element 14. The fastener 14 is of conventional construction and in addition to the head 34 includes a pair of complementary diverging and converging arms 35 and 37. The head is inserted through the slot 32 by starting one edge 36 of the head through the slot and thereafter rotating the fastener to carry the entire head through the slot. After the head has been inserted through the slot, the fastener is in the position, with relation to the retainer plate, shown in Fig. 5. The fastener 14 is inserted into the plate 12 after the latter has been secured to the panel.

To secure the retainer plate to a panel, such panel is provided with a recess 22. The plate is placed in the recess 22 in the position shown in Fig. 2. The marginal prongs 30 rest upon the floor 38 of the recess and may abut the sides thereof. A tool 40, mounted in a press (not shown) is then brought down upon the plate, encircling the shoulder 26 and abutting the skirt portion 28 of the plate adjacent to the shoulder 26. The tool is urged toward the panel flattening the plate to a more nearly planar shape as shown in Figs. 3 and 5. As the plate is flattened, the prongs 30 on opposite sides of the plate are urged farther apart and into the panel through the sides of the recess 22. The outward movement of the prongs is along lines extending radially with respect to the retainer plate. With the prongs embedded in the panel through the sides of the recess, the retainer plate will not pull out of the recess.

In order to flatten the plate and urge the prongs into the panel, the skirt portion 28 of the plate must be stretched and also bent. The bending of the skirt occurs at the shoulder 26. The shoulder 26 is the weakest or most easily bent portion of skirt 28 and therefore it is at the shoulder that the bending of the skirt occurs. The stretching of the skirt occurs throughout its entire area, with the greatest amount of stretching occurring at the serrated edge or margin of the skirt. Therefore, to pull the plate out of the recess after it has been flattened, requires compressing the metal of the skirt and this would necessitate a considerable force. Consequently once the plate is secured in the recess it is very difficult to pull it out. It is this distorting and stretching of the margin of the plate which gives it the tight hold on the panel.

After flattening the plate it is disposed in the position shown in Figs. 3–4. The crown portion of the plate is shown as spaced above the floor 38 of the recess a distance sufficient to permit the insertion of the head of the fastener 14 through the slot. After the fastener is inserted in the plate, the panel is moved so as to align the fastener with the aperture 18 in the frame. The panel is then pressed toward the frame and the fastener sprung into the aperture 18. The panel, retainer plate, fastener and frame are then in the positions shown in Fig. 5.

It may be noted that the slot 32 in the plate is elongated. This permits a certain amount of lateral movement of the fastener within the plate, thereby accounting for any misalignment of the apertures of the frame with the fasteners of the panel. It also accommodates for expansion or contraction or adjustment of the panel after being mounted on the frame. In addition it should be noted that the crown 24 of the plate, before the plate has been flattened, as is shown in Fig. 2, is disposed above the plane of the surface 42 of the panel, and after flattening of the plate the crown is disposed in the plane of surface 42 as shown in Fig. 5. This ensures that the panel will abut the frame at the surface 42 as shown, and not merely at the crown of the retainer plate.

As mentioned above the plate 12–a shown in Fig. 6 is slightly elongated. Such elongation of the plate precludes any possibility of the retainer plate rotating in the recess. In all respects plate 12–a is the same as plate 12 except for the difference in its circular configuration.

Fig. 7 shows a retainer plate supporting a tubular connection 44. The panel might there be the side wall of a container with which the connection 44 communicated. Instead of a tubular connection, any other type of part or device might be secured to the retainer plate in a similar manner.

Fig. 8 shows a different form of fastener. It is a spring type of fastener which has one short leg 46 that terminates in a hook end 48 that is engaged over the margin of the aperture 32 through the retainer plate. The other and long leg 50 of the fastener overlies the retainer plate and engages the side wall of the recess within the panel 10. This long arm is tensioned so that the end formed by the fold of the two arms is held yieldingly toward the panel.

What I claim is:

1. In combination with a fastener having a head portion and a shank portion disposed substantially perpendicularly with respect to the head portion, a fastener retainer plate comprising: a substantially circular plate dish shaped in cross section and having a crown portion and a peripheral skirt portion connected with the crown all around by an intervening shoulder portion, said skirt portion extending angularly away from the shoulder portion at an obtuse angle with respect to the underside of the plane of the crown, said skirt having a serrated margin, said crown portion provided with an aperture therethrough adapted to receive the shank portion of the fastener the head of which is disposed underneath said crown portion, the skirt of said plate being deformable from said obtuse angular position with respect to the underside of the plane of the crown to a more nearly parallel position with respect thereto, said shoulder having a height not less than the thickness of the head of the fastener the shank of which is received through the aperture in the crown.

2. A combination with a panel having a generally circular recess formed within one surface thereof of a generally circular dish-shaped retainer plate having an apertured crown portion and a marginally serrated skirt portion, said skirt portion extending outwardly angularly away from the crown portion at an obtuse angle with respect to the underside of the plane of the crown and connected with the crown by a shoulder portion spacing the crown above the skirt by at least the thickness of the plate, said retainer plate disposed within the recess in the panel with its skirt portion embedded within the structure of the panel surrounding the recess to a point inwardly at least of its serrated edge, said skirt being flattened during the embedding operation with resulting increase of diameter and marginal circumference of the skirt portion, the crown portion of the plate being spaced above the bottom of the recess by the height of the shoulder at least.

References Cited in the file of this patent

UNITED STATES PATENTS

| 1,675,787 | Carr | July 3, 1928 |
| 1,675,788 | Carr | July 3, 1928 |
| 2,005,895 | Hengstenberg | June 25, 1935 |
| 2,519,585 | Maxim | Aug. 22, 1950 |